United States Patent
Rogg (10) Patent No.: US 12,480,477 B2
(45) Date of Patent: Nov. 25, 2025

(54) MAIN BEARING UNIT

(71) Applicant: Siemens Gamesa Renewable Energy A/S, Brande (DK)

(72) Inventor: Andreas Rogg, Hamburg (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/787,205

(22) Filed: Jul. 29, 2024

(65) Prior Publication Data
US 2025/0043774 A1  Feb. 6, 2025

(30) Foreign Application Priority Data
Aug. 2, 2023  (EP) .................................... 23189135

(51) Int. Cl.
*F16C 25/08* (2006.01)
*F03D 80/70* (2016.01)

(52) U.S. Cl.
CPC .......... *F03D 80/703* (2023.08); *F16C 25/083* (2013.01); *F05B 2240/54* (2013.01); *F16C 2229/00* (2013.01)

(58) Field of Classification Search
None
See application file for complete search history.

(56) References Cited

U.S. PATENT DOCUMENTS

| 3,934,957 | A  | * | 1/1976 | Derner | ................... | F16C 23/086 |
| | | | | | | 384/563 |
| 2003/0113049 | A1 | * | 6/2003 | Shore | ....................... | F16C 25/06 |
| | | | | | | 384/548 |
| 2015/0226266 | A1 | * | 8/2015 | Mori | ..................... | B23Q 11/123 |
| | | | | | | 384/467 |
| 2017/0074317 | A1 | * | 3/2017 | Reichert | ................. | F16C 25/08 |

FOREIGN PATENT DOCUMENTS

| CN | 101189436 | A  | * | 5/2008 | ........... | F04D 17/168 |
| DE | 102009058355 | A1 | | 6/2011 | | |
| DE | 102010048546 | A1 | * | 4/2012 | .............. | F16C 25/08 |
| WO | 2012097962 | A2 | | 7/2012 | | |

OTHER PUBLICATIONS

European Search Report issued on Jan. 31, 2024, for application No. 23189135.9.

* cited by examiner

*Primary Examiner* — John Olszewski
*Assistant Examiner* — Aimee Tran Nguyen
(74) *Attorney, Agent, or Firm* — Schmeiser, Olsen & Watts, LLP (57) ABSTRACT

A main bearing unit of a wind turbine drivetrain is provided, including a number of bearings arranged about a low-speed shaft of the drivetrain; a housing arranged to enclose the bearings; a preload ring arranged between an inner surface of the housing and the outer race of a bearing, which preload ring is adapted to facilitate its axial displacement during a bearing preload reinstatement procedure; and a fastener for fixing the position of the preload ring to the housing fol- (Continued)

lowing a bearing preload reinstatement procedure. Also provided is a bearing preloading arrangement for use in reinstating preload in a bearing of such a main bearing unit; and a method of reinstating a preload force in a bearing of such a main bearing unit.

11 Claims, 7 Drawing Sheets

MAIN BEARING UNIT

CROSS-REFERENCE TO RELATED APPLICATIONS

This application claims priority to EP Application No. 23189135.9, having a filing date of Aug. 2, 2023, the entire contents of which are hereby incorporated by reference.

FIELD OF TECHNOLOGY

The following relates to a main bearing unit.

BACKGROUND

In an established type of wind turbine drivetrain, the low-speed shaft or main shaft is turned by the aerodynamic rotor and connected to the drive end of a gearbox. A main bearing unit supports the low-speed shaft by a pair of tapered roller bearings, one of which is installed about the front or drive end of the shaft, and the other is installed about the rear or non-drive end of the shaft. The bearing assemblies can be held in place by a housing.

The bearings are generally preloaded, since failure-free operation of such bearings requires that a minimum preload is maintained over the lifetime of the wind turbine. In the existing configurations, the bearing lifetime would typically exceed the service life of the wind turbine, so that it has not been necessary to facilitate maintenance procedures to exchange the main bearing unit or to reinstate the bearing preload. Instead, the established practice has been to engineer the main bearing unit according to the expected service life of the corresponding wind turbine.

However, the service life of present-day wind turbines has been extended significantly, from 20 years (older wind turbines) to 25-35 years (modern wind turbines), and it is desirable that major components such as the main bearing unit should have a corresponding extended service life or "fatigue life".

It is known to preload a wind turbine main bearing unit during assembly to a level that includes margins for assembly tolerance, measurement tolerance, settlement, creep, wear and relaxation over the bearing's estimated service life. Since these margins are chosen to cover rarely occurring worst case situations, even a conservative preload level is already quite large, and a significant share of the fatigue damage that limits the service life arises from bearing preload. However, it is generally not possible to extend the service life of a main bearing unit by lowering the initial preload level with the aim of mitigating fatigue from preload, since insufficient preload leads to other types of wear that unavoidably result in premature fatigue damage.

Therefore, the longer service life of a wind turbine leads to problems with the main bearing unit, since the bearing preload levels, which make it possible to avoid service issues during a "short" wind turbine service life (ca. 20 years), cannot be decreased to extend the bearing service life to match a "long" wind turbine service life (e.g., 25-35 years).

One way of increasing the fatigue or service lifetime of a main bearing is to make it larger, i.e., by increasing the overall dimensions of the rollers, races, bearing housing, etc. However, the costs of engineering the main bearing unit to the longer service life of a modern wind turbine adds significantly to the cost of the wind turbine.

SUMMARY

An aspect relates to a main bearing unit that overcomes the problems outlined above.

While the inventive main bearing unit could be used in various types of drivetrain, it is particularly suited for use in the drivetrain of a wind turbine. The inventive main bearing unit could be used in a direct-drive generator connected to the main shaft. In the following, without restricting embodiments of the invention in any way, it may be assumed that the main bearing unit is constructed for use in a wind turbine drivetrain comprising a low-speed shaft arranged to drive a high-speed unit comprising a gearbox and a generator.

According to embodiments of the invention, the main bearing unit comprises a number of bearings arranged about the low-speed shaft, e.g., a front bearing arranged about the drive end of the low-speed shaft and a rear bearing arranged about the non-drive end of the low-speed shaft. The main bearing unit further comprises a housing arranged to enclose the bearing(s). The inventive main bearing unit further comprises a preload ring arranged between an inner surface of the housing and the outer race of a bearing (the front bearing and/or the rear bearing), which preload ring is adapted to facilitate its own displacement (from an initial position) during a bearing preload reinstatement procedure performed in the already operational drivetrain. The inventive main bearing unit further comprises a fastener for fixing the position of a preload ring to the housing after displacement (to a final position, which can be offset by a few millimeters) during the bearing preload reinstatement procedure.

An advantage of the inventive main bearing unit is that bearing preload can be reinstated in a straightforward procedure at any time during the service life of the wind turbine, so that this main bearing unit can be incorporated in the drivetrain of a wind turbine with an extended service life. The structural modifications to arrive at the inventive main bearing unit are significantly less expensive than engineering the main bearing unit to include larger bearings.

Furthermore, there is no need to set an excessive preload force during manufacture of the main bearing unit for installation in a wind turbine with an extended lifetime. It follows that the inventive main bearing unit does not suffer from accumulated bearing fatigue damage resulting from excessive preload.

According to embodiments of the invention, the bearing preloading arrangement for use in reinstating preload in a bearing of such a main bearing unit comprises a radial force relief means or device adapted to relieve a radial force acting on a preload ring during a bearing preload reinstatement procedure; and an axial displacement means or device adapted to displace that preload ring axially relative to the bearing housing, during radial force relief, from an initial position to a final position (the difference can be in the order of a few mm). The bearing preloading arrangement further comprises a means of or fastener for securing the axially displaced preload ring at its new position.

According to embodiments of the invention, the method of reinstating a preload force in a bearing of such a main bearing unit using an embodiment of the claimed bearing preloading arrangement comprises the steps of arranging the axial displacement means or device and the radial force relief means or device in place relative to the housing and the preload ring that is to be displaced; actuating the radial force relief means to relieve a radial force acting on the preload ring; and simultaneously actuating the axial displacement means to effect an axial force on the relieved preload ring to displace the preload ring from its initial position to a final position. During the preload reinstatement procedure, the shaft is rotated at a suitable rate while the axial displacement means is being actuated. In embodiments, the method includes a step of subsequently fixing the preload ring at its final position relative to the housing.

While the procedure of setting the main bearing preload is particularly advantageous when performed in an already operational drivetrain, the procedure can of course be used to set the initial bearing preload for main bearing unit during the drivetrain assembly stage. In the following, any description of a preload reinstatement procedure during the service life of the bearing may be assumed to apply also to an initial preload setting procedure during drivetrain assembly. The expressions "bearing preload force", "bearing preload", "preload force" and simply "preload" may be used interchangeably herein.

In the following, it may be assumed that the housing of the main bearing unit is shaped to accommodate the preload ring, for example the main bearing unit can be provided with a seat shaped to match one or more surfaces of the preload ring.

The preload ring and the outer ring of the bearing can be separate entities, i.e., the preload ring is shaped to fit exactly about the outer bearing ring. Equally, the preload ring and outer bearing ring can be formed as a single part. In the following, for the sake of clarity but without restricting embodiments of the invention in any way, these parts are referred to separately.

In an embodiment of the invention, the preload ring fixing means comprises an annular arrangement of fasteners, each comprising a threaded portion to engage with an axial threaded bore formed in the preload ring. Equally, the preload ring fixing means can comprise a threaded ring or lock nut with a diameter similar to the diameter of the preload ring, and comprising an external thread arranged to engage with a complementary threaded region of the housing.

At its drive end and/or its non-drive end, the housing of the main bearing unit in one exemplary embodiment can comprise a flange or other structural feature, with an annular arrangement of bores to accommodate the shanks of preload fasteners. In an embodiment, a preload ring fastener comprises a threaded portion to engage with an axially-extending threaded bore formed in the preload ring. A preload ring fastener can be realized as a tension screw or a thrust screw, depending on which side of the preload ring is provided with the corresponding threaded bores. In case of a thrust screw, the thread could be formed in the housing flange instead of in the preload ring.

The preload ring of the inventive main bearing unit can facilitate its own displacement in the axial direction, from an initial position to a final position, during a preload setting procedure. In an embodiment of the invention, the preload ring is adapted to facilitate relief of a radial force exerted by an inner surface of the housing on the outer surface of the preload ring, i.e., to facilitate relief of the press-fit between housing and preload ring. By reducing or effectively removing the press-fit forces acting on the preload ring for a brief duration, the preload ring becomes gradually or completely free and can be displaced in the axial direction during a bearing preload reinstatement procedure.

In an embodiment of the invention, an annular configuration of passages is formed in the preload ring and/or in the bearing housing. A passage can extend between the outer surface and a side face of the preload ring; equally a passage can extend between the interior and the exterior of the housing and is used to convey a pressurized fluid such as compressed air or a hydraulic fluid such as oil to the region between the housing interior surface and the preload ring outer surface.

Since the bearing preload may need to be reinstated at some time during the service life of the wind turbine, and the main bearing unit is already installed as part of an operational drivetrain, the housing of the main bearing unit comprises suitable access openings to accommodate components of the radial force relief means and the axial displacement means so that this equipment can be put into place with a minimum of effort.

The radial force relief means comprises a hydraulic arrangement configured to establish a fluid cushion between the housing interior surface and the preload ring outer surface. In an embodiment of the invention, this hydraulic arrangement comprises a pressurized fluid supply (for example compressed air or oil) and hoses for conveying the pressurized fluid to a region between the housing interior surface and the preload ring outer face. The pressurized fluid creates a gap where previously there was none, effectively breaking the press-fit between the housing interior surface and the preload ring outer surface, allowing the preload ring to be axially displaced. The fluid cushion shall be understood to encircle the preload ring, i.e., the fluid cushion is established about the entire circumference of the preload ring, so that uniform axial displacement of the preload is facilitated. When the fluid cushion has been established, the shaft is caused to rotate (along with the inner bearing race), allowing a very precise re-positioning of the preload ring.

In an embodiment of the invention, the housing comprises an interior surface feature shaped to act as a rigid support for the axial displacement, so that this can efficiently exert an axial force against the preload ring. The axial displacement means can be any kind of linear actuator capable of exerting an axial force against a side face of the preload ring to push it in axial direction (parallel to the drivetrain axis of rotation). In an embodiment of the invention, the axial displacement means comprises a hydraulic cylinder of a hydraulic circuit. The hydraulic cylinder comprises a piston which extends to apply an axial force against a side face of the preload ring. The hydraulic circuit shall be understood to comprise the usual components such as a motor-driven pump, a fluid tank, a fluid reservoir, and an arrangement of valves to control fluid flow through the hoses and cylinder.

In an embodiment of the inventive preloading arrangement, the position fixing means comprises a tightening means such as a motor-driven torque wrench or other suitable tool for tightening the preload ring fasteners.

In an embodiment, the inventive preloading arrangement comprises a control arrangement configured to actuate the radial force relief means, the axial displacement means and the tightening means in a predefined order during a bearing preload reinstatement procedure. For example, after setting up the radial force relief means and the axial displacement means, the control arrangement can actuate the radial force relief means to break the press-fit and then actuate the axial displacement means to displace the preload ring in the axial direction away from its initial position. The control arrangement can then switch off the radial force relief means to restore the press-fit between housing and preload ring, before switching off the axial displacement means to remove the axial force against the preload ring. The preload ring is now in its final position, and the tightening means, e.g., the preload ring fasteners can be re-tightened. Alternatively, it would also be possible to tighten the preload ring in its final position while the axial force is still being applied.

As explained above, a suitably high initial bearing preload force is generally established during a final manufacturing stage of the main bearing unit. This bearing preload can gradually diminish over time. It is generally only necessary to reinstate the bearing preload if the preload force has decreased to a predetermined lower threshold, at which point the kinematics of the rollers are no longer ensured. Therefore, in a further embodiment of the invention, the inventive method comprises a preliminary step of determining the actual bearing preload force at some time during the service life of the wind turbine. For example, the actual bearing preload force can be determined by measuring the elongation of the main shaft. Alternatively, or in addition, the actual bearing preload force can be determined from a measured radial displacement of the main shaft.

BRIEF DESCRIPTION

Some of the embodiments will be described in detail, with reference to the following figures, wherein like designations denote like members, wherein.

DETAILED DESCRIPTION

Figure 1:
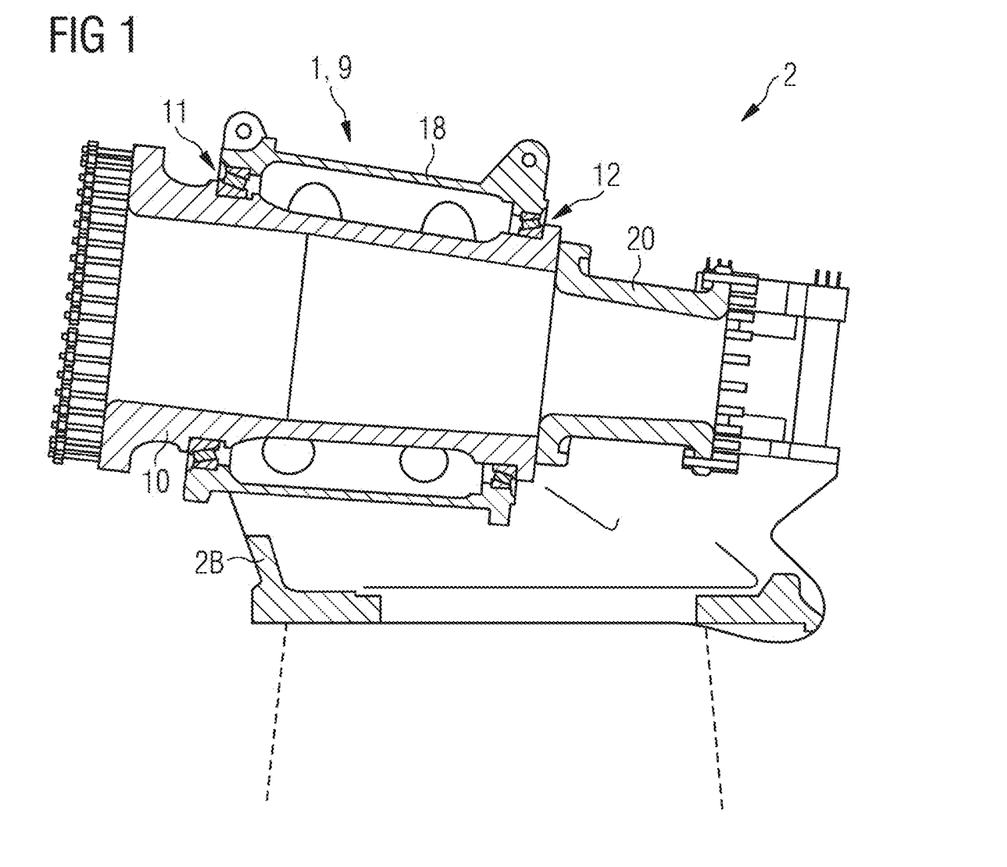
FIG. 1 shows a main bearing unit of a wind turbine drivetrain.

FIG. 1 shows a cross-section through part of a wind turbine drivetrain 2, showing a main bearing unit 9 in place about a low-speed shaft 10, and a coupling interface 20 at the downwind end of the shaft 10 for connection to the next stage of the drivetrain. The main bearing unit 9 is in place about the low-speed shaft 10 and comprises two tapered roller bearings 12, enclosed in a bearing housing 18. In this exemplary embodiment, the housing 18 is secured to a bedplate 2B with a flat base for mounting to the top of a wind turbine tower (indicated by ghost lines). Each bearing 12 comprises tapered rollers arranged between an inner race and an outer race. Various annular elements are provided about the main shaft 10 and the housing 18 for applying preload to the bearings.

Figure 2:
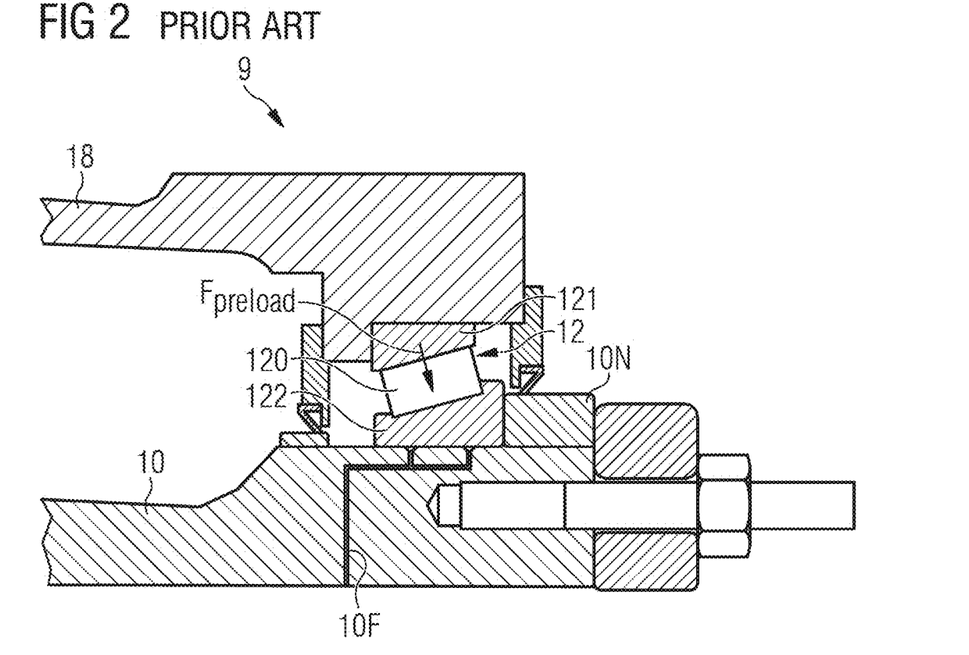
FIG. 2 shows the rear bearing in a conventional art main bearing unit.

FIG. 2 shows a conventional art rear bearing 12 of a main bearing unit 9, showing elements relevant to preloading the rear bearing 12. The position of the inner race 122 on the shaft is fixed by an annular component about the main shaft 10, e.g., a lock nut 1ON. During assembly of the conventional art main bearing unit 9 at the manufacturing facility, and after the housing 18 is put in place about the shaft 10 and bearings 12, bearing preload can be achieved by stretching the shaft 10, for example with a hydraulic tool, while fixing the position of the rear bearing 12 relative to the housing 18, in a procedure that will be known to the skilled person. To this end, a press-fit between the rear bearing inner race 122 and the shaft 10 is relieved, for example by forcing pressurized fluid through passages 10F to form a fluid "cushion" between the contact surfaces of the inner race 122 and shaft 10. To this end, a suitable configuration of ducts or passages 10F are provided in the body of the shaft 10. During the preload procedure, the shaft 10 and bearing inner race 122 must be rotated relative to the housing 18 in order to avoid damage to the bearing rollers 120 and raceways 121, 122, and the tools used for this procedure are constructed to facilitate this rotation. After deactivating the shaft stretching tool and removing the fluid cushion to restore the press-fit between shaft 10 and bearing inner race 122, the new position of the bearing 12 is fixed by the reinstated press-fit and by turning the lock nut 1ON about the low-speed shaft 10. The main bearing unit 9 can now be transported to a wind turbine for installation inside a nacelle. The bearing preload force $F_{preload}$ established during manufacture of the main bearing unit 9 may be sustained during the service life of a conventional art wind turbine. However, the extended service life possible with present-day wind turbines means that the initial preload force is insufficient, but increasing the preload force at the outset can, as explained in the introduction, lead to bearing fatigue damage resulting in a premature defect or complete failure of the bearing.

While the same approach could be used to reinstate bearing preload at a later stage in the lifetime of the wind turbine, it is difficult to install such tools in an operational drivetrain. It would be prohibitively difficult to dismantle the necessary equipment and transport it to a wind turbine site for installation in the nacelle. Furthermore, the main shaft 10 must be rotated during the preloading procedure as explained above but is now enclosed in a housing 18 so that tools used at the manufacturing facility (to stretch the shaft 10 and to generate a fluid cushion in the press-fit region between shaft and bearing) cannot simply be deployed in the nacelle of an operational wind turbine. Also, it would be necessary to provide some means of retaining the rear bearing at its new position on the shaft. For example, such a main bearing unit 9 would require an adjustable locking means or device such as an arrangement of fasteners between the shaft 10 and the inner race 122 of the rear bearing 12. Any such arrangement of fasteners must be accessible to a technician during the preloading procedure, and the necessary redesign of the main bearing unit 9 would add significantly to the overall cost.

Figure 3:
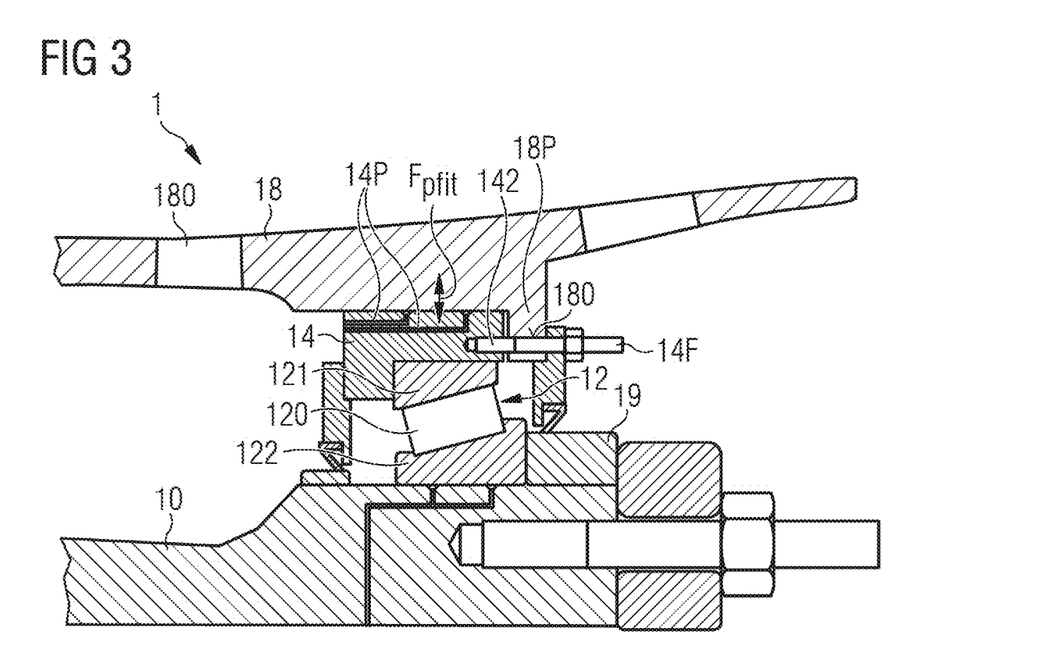
FIG. 3 shows embodiments of the inventive main bearing unit and illustrate the inventive preload reinstatement procedure.
Figure 4:
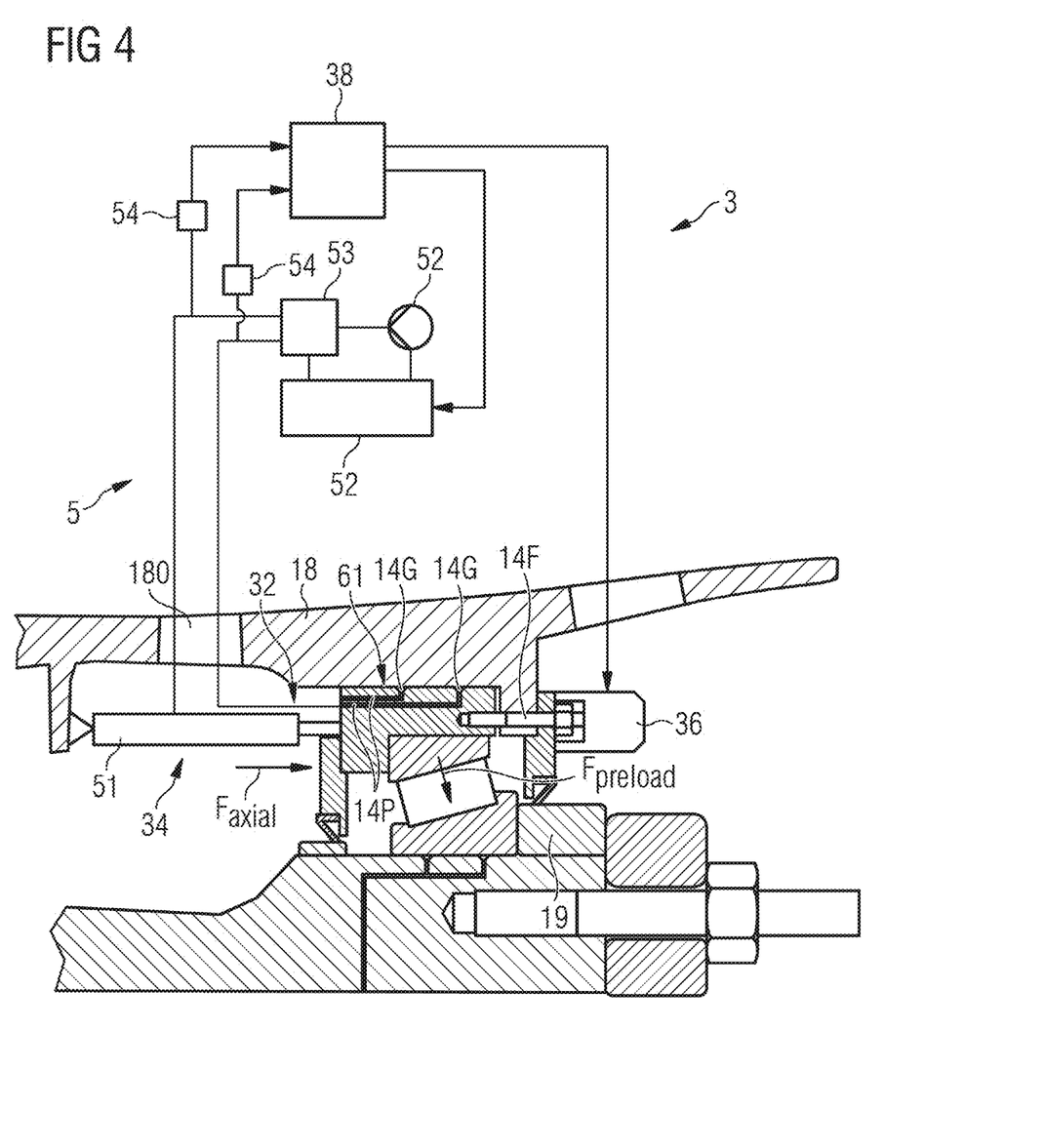
FIG. 4 shows embodiments of the inventive main bearing unit and illustrate the inventive preload reinstatement procedure.

The inventive main bearing unit 1 has a structure similar to the conventional art main bearing unit 9 shown in FIG. 1. Bearing preload of the front and/or rear bearing can be set in the manufacturing facility using the inventive method, i.e., the same straightforward procedure is used to set the initial bearing preload and to reinstate bearing preload at any stage during the service life of the wind turbine, as will be explained in the following:

FIGS. 3 and 4 show the rear bearing 12 in an exemplary embodiment of the inventive main bearing unit 1 (the following description may be assumed to apply equally to the front bearing). The bearing rollers 120 of the rear bearing 12 are inclined at an angle between the inner and outer races, and the bearing rollers of the front bearing may be assumed to be in inclined in the opposite direction, in what is commonly referred to as an "O" configuration. Of course, the reverse "X" configuration could equally be chosen, as the skilled person will be aware.

A preload ring 14 is placed between the outer race 121 of the bearing 12 and the housing 18. About the rear face of a preload ring seat formed in the housing 18, an annular arrangement of preload fasteners 14F (tension screws in this case) is provided. Each preload fastener 14F passes through an axial bore 182 formed in the preload ring seat and is screwed into an axial threaded bore 142 formed in the preload ring 14. The preload force $F_{preload}$ acting on the outer race 121 of the rear bearing 12 can be the result of the press-fit between the preload ring 14 and the housing 18 and/or the result of tightening the preload fasteners 14F.

In this exemplary embodiment of the inventive main bearing unit 1, the preload ring 14 is provided with an arrangement of ducts 14P extending between its "upwind" side face and its outward facing surface. These passages 14P can be used to establish a fluid cushion—an air cushion or a fluid film—for preload setting during drivetrain assembly as well as during a bearing preload reinstatement procedure.

In FIG. 4, the axial displacement means or device is a hydraulic cylinder 51 of a hydraulic arrangement 5, arranged inside the main bearing unit 1. The purpose of the hydraulic cylinder 51 is to apply an axial force $F_{axial}$ against the annular side face of the preload ring 14. To allow displacement of the preload ring 14 in the axial direction, radial pressure $F_{pfit}$ causing the press-fit between housing 18 and preload ring 14 is first relieved. To this end, the inventive bearing preloading arrangement 3 deploys a radial force relief means or device 32, which in this case is also part of the hydraulic arrangement 5, with hydraulic lines arranged to force pressurized fluid through preload ring passages 14P, creating a fluid cushion between housing 18 and preload ring 14, about the entire circumference of the preload ring 14, to facilitate axial displacement of the latter by the hydraulic cylinder 340, as indicated by the arrow. The preload ring position fixing means or fastener—in this case threaded fastener(s) 14F—can then be tightened using the tightening/tensioning tool 36 to a suitable torque or tensioning force.

The preload fasteners 14F and the tightening/tensioning tool 36 can be deployed together as an axial displacement means. Once the fluid cushion is established between preload ring 14 and housing 18, the tool 36 can be actuated to turn or apply traction to the relevant preload fastener(s) 14F, thereby effecting the desired axial displacement of the preload ring 14. Equally, axial displacement can be effected by a hydraulic cylinder 51 as described above, in conjunction with the preload fasteners 14F and tensioning tool 36.

Again, the reinstated preload force $F_{preload}$ acting on the outer race 121 of the rear bearing 12 can be the result of the press-fit between the preload ring 14 and the housing 18 and/or the result of re-tightening the preload fasteners 14F.

In this exemplary embodiment, the hydraulic arrangement 5 further comprises a power unit 50 with tank, a pump 52, a control valve arrangement 53, pressure and/or flow sensors 54, and a suitable arrangement of fluid lines. A control module 38 can be used to control components of the hydraulic arrangement 5 to establish the hydraulic cushion between preload ring 14 and housing 18, to displace the preload ring 14, and to tighten the preload ring fixing means 14F.

For example, the control module 38 controls hydraulic flow and/or pressure and the sequence of actuation of the pressure relief means 32 and the axial displacement means 34. The pressure relief means or pressure relief device 32 can be controlled by measuring the hydraulic pressure/flow exerted by the pressure relief means 32, using a suitable sensor 54. An axial displacement of the preload ring 14 and the resulting bearing preload $F_{preload}$ can be monitored by measuring the hydraulic pressure/flow exerted by the axial displacement means 34 using a suitable sensor 54. The axial displacement between a bearing 12 and the housing 18 can also be measured using a suitable sensor.

Figure 5:
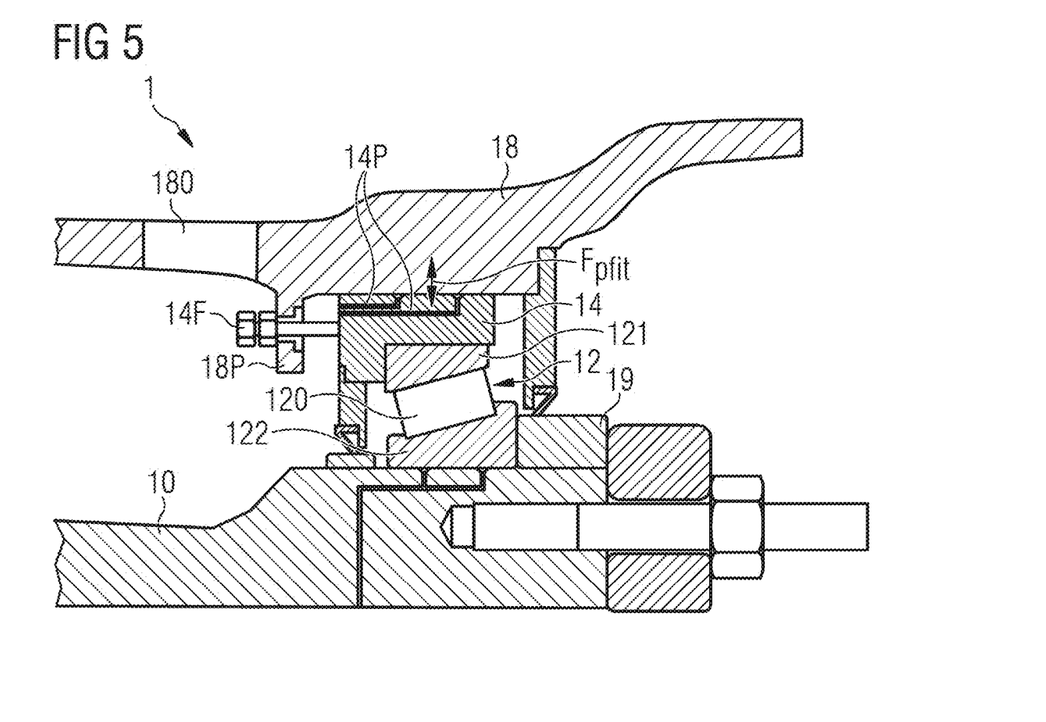
FIG. 5 shows embodiments of the inventive main bearing unit and illustrate the inventive preload reinstatement procedure.
Figure 6:
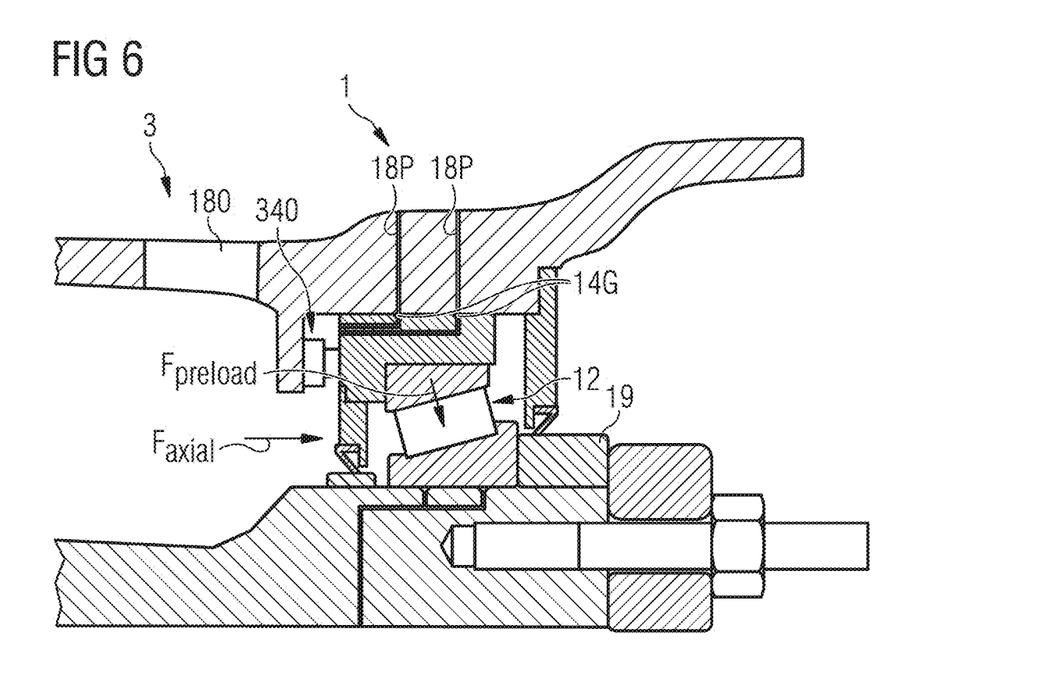
FIG. 6 shows embodiments of the inventive main bearing unit and illustrate the inventive preload reinstatement procedure.

FIG. 5 and FIG. 6 show the rear bearing 12 in a further exemplary embodiment of the inventive main bearing unit 1. In this configuration, the housing 18 of the main bearing unit 1 is constructed with an inwardly projecting flange to receive the preload fasteners 14F (thrust screws in this case), which are arranged to apply an axial force against the upwind face of the preload ring 14 as shown in FIG. 4.

Again, the preload ring 14 is provided with an arrangement of passages 14P as explained in FIG. 3. Each passage 14P opens into an annular or helical groove 14G extending about the circumference of the preload ring 14. An arrangement of parallel annular grooves 14G might be linked by a suitable arrangement of axial grooves. In this embodiment, a more compact axial displacement means 34 is used, placed in a space between preload fasteners 14F as indicated in FIG. 5. In a procedure similar to the procedure explained in FIG. 3, with a similar hydraulic arrangement (not shown) the axial displacement means 34 is actuated to apply an axial force $F_{axial}$ against the annular side face of the preload ring 14, while pressurized fluid is forced into the ducts 14P of the preload ring 14 to relieve the press-fit between housing 18 and preload ring 14. The diagram also shows passages 18P formed in the housing 18, which could be used together with, or as an alternative to, the passages 14P formed in the preload ring 14 to establish the fluid cushion. After axial displacement of the preload ring 14, the preload fasteners 14F are re-tightened. Each fastener 14F is tightened by an appropriate torque. Again, the reinstated preload force $F_{preload}$ acting on the outer race 121 of the rear bearing 12 can be the result of the press-fit between the preload ring 14 and the housing 18 and/or the result of re-tightening the preload fasteners 14F.

Figure 7:
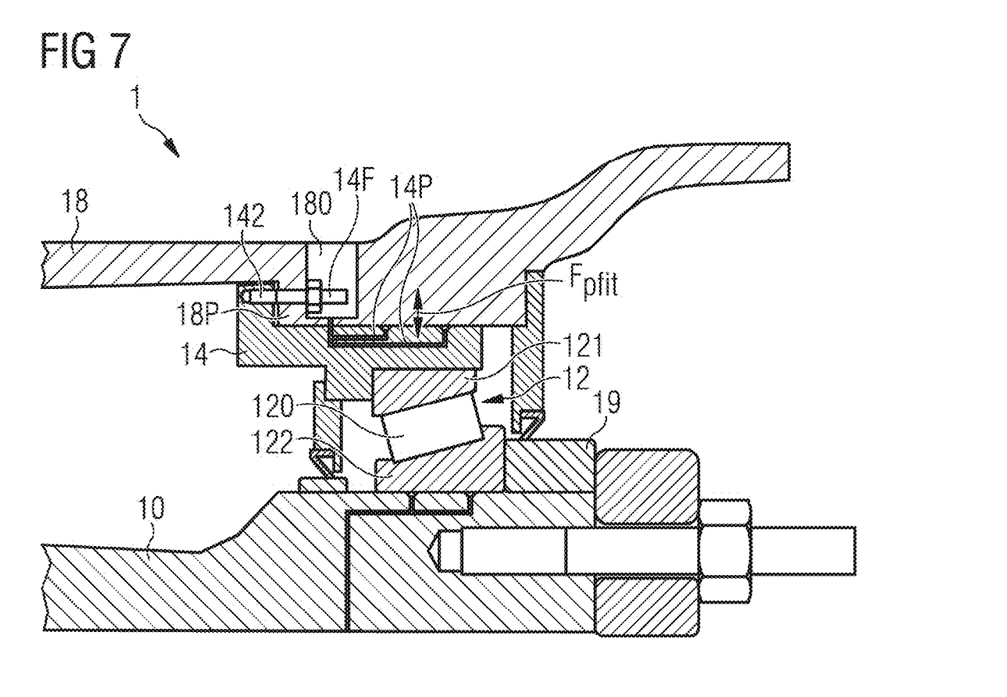
FIG. 7 shows embodiments of the inventive main bearing unit and illustrate the inventive preload reinstatement procedure.
Figure 8:
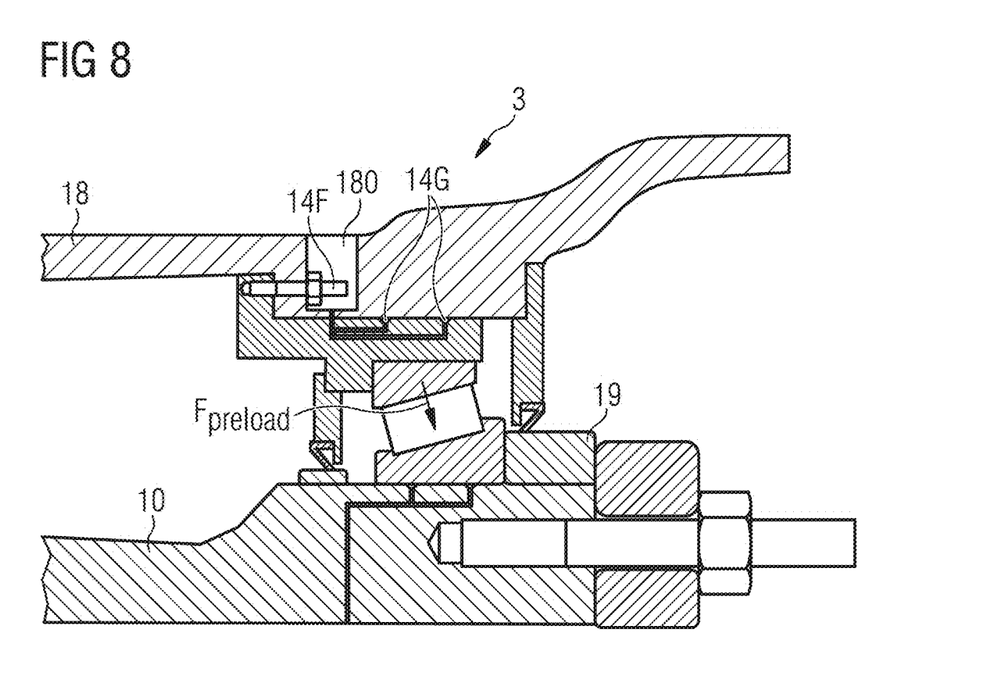
FIG. 8 shows embodiments of the inventive main bearing unit and illustrate the inventive preload reinstatement procedure.

FIG. 7 and FIG. 8 show the rear bearing 12 in a further exemplary embodiment of the inventive main bearing unit 1. In this configuration, the housing 18 of the main bearing unit 1 is constructed with an inwardly extending portion in which an annular arrangement of recesses 184 is provided to receive the preload fasteners 14F (tension screws in this case). The preload ring 14 comprises a flange 144 at its upwind end to lie against the inwardly extending portion of the housing 18. In this configuration, the preload fasteners 14F exert an axial traction force against the preload ring flange 144 as shown in FIG. 7.

Again, the preload ring 14 is provided with an arrangement of ducts 14P as explained above. In this embodiment, an axial displacement tool or linear actuator such as a hydraulic cylinder is placed to exert an axial force against the preload ring 14 in a procedure similar to the procedure explained above, while a further hydraulic arrangement 32 forces pressurized fluid into the ducts 14P of the preload ring 14 to relieve the press-fit between housing 18 and preload ring 14. Again, the reinstated preload force $F_{preload}$ acting on the outer race 121 of the rear bearing 12 can be the result of the press-fit between the preload ring 14 and the housing 18 and/or the result of re-tightening the preload fasteners 14F using a tool 36 as indicated in FIG. 8.

Figure 9:
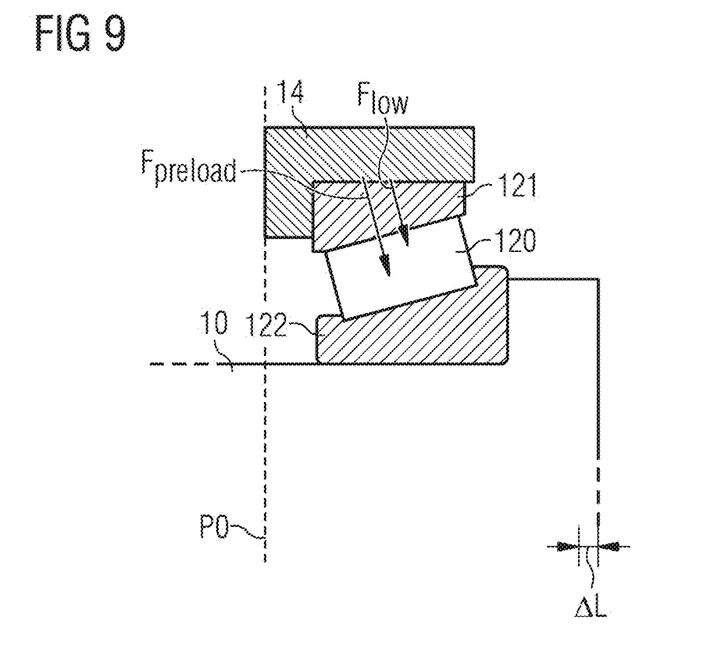
FIG. 9 illustrates stages during the inventive preload reinstatement procedure.
Figure 10:
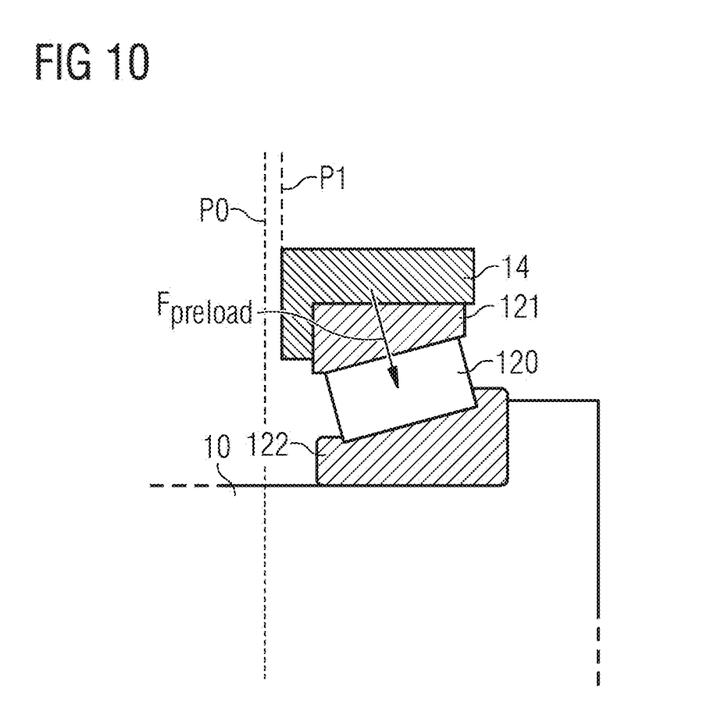
FIG. 10 illustrates stages during the inventive preload reinstatement procedure.

FIG. 9 and FIG. 10 illustrates the inventive approach to reinstating the bearing preload in a main bearing unit as described in FIGS. 3-8. At some point during the service life of a wind turbine, the bearing preload of the rear bearing is monitored. For example, from a measured shaft elongation ΔL, the reduction in bearing preload force (from its initial value) can be computed. FIG. 8 schematically indicates the initial bearing preload force $F_{preload}$ and the reduced bearing preload force $F_{low}$ (as indicated by the shorter arrow). In FIG. 9, after axially displacing the preload ring 14 from its initial position P0 to a final position P1 as explained in FIGS. 3-8 above, the reinstated bearing preload force $F_{preload}$ is the same as the initial bearing preload force $F_{preload}$. The wind turbine can continue to operate without risk of fatigue damage to the rear bearing 12.

Figure 11:
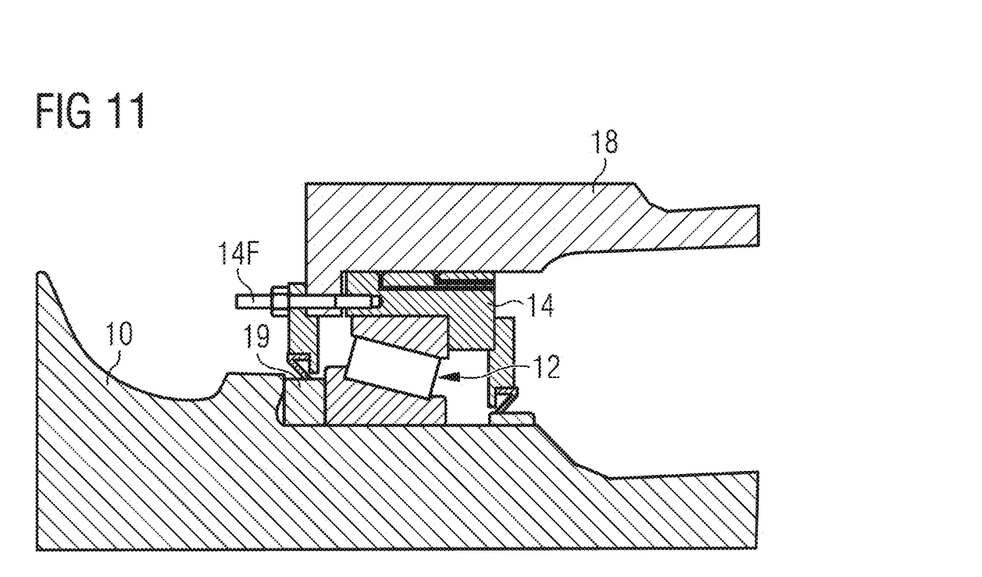
FIG. 11 shows alternative embodiments of the invention.

FIG. 11 shows an alternative embodiment of the invention. Here, a preload ring 14 is located between the housing 18 and the front bearing 12 of the wind turbine drivetrain. The preloading fasteners 14F can be located on the upwind side of the front bearing 12, "pulling" the preload ring 14 towards the drive end of the shaft 10, thus stretching the shaft 10 relative to the housing 18, to reinstate preload force on the bearing 12. As in the embodiments described in FIGS. 3-8 above, channels in the preload ring 14 allow a hydraulic tool to relieve the press-fit between the preload ring and the housing 18.

The rear bearing can be equipped with its own preload ring and preloading fasteners as described above, i.e., both front and rear bearings 12 can be preloaded using the inventive approach. Alternatively, only one of the two bearings is configured for preload reinstatement according to embodiments of the invention, and the outer race of the other bearing can be secured to the bearing housing.

Figure 12:
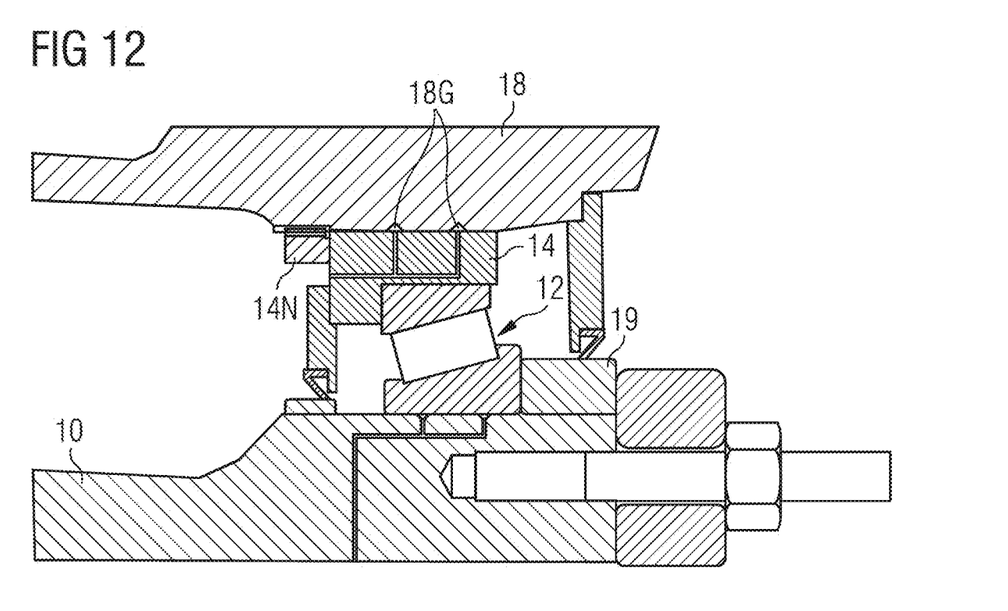
FIG. 12 shows alternative embodiments of the invention.

FIG. 12 shows an embodiment with an alternative preload ring fastening means 14N in the form of a large diameter locking nut 14N arranged between the preload ring 14 and the housing 18, with an outer thread to engage with a corresponding thread formed on the inner surface of the housing 18. To prevent the preload ring 14 and outer bearing race from turning during a preload setting procedure, a rotation lock may be provided, for example a form-fit pin (not shown), fixed to the housing and arranged to protrude into an axial bore formed in the preload ring. Such a pin prevents rotation of the preload ring while allowing it to be displaced in the axial direction during the preload setting procedure. This diagram also shows an alternative arrangement of passages 14P and grooves 18G. Here, passages 14P in the preload ring 14 open into annular grooves 18G formed in the housing 18, for use in establishing the fluid cushion as described above.

In any of the embodiments described above, shim rings 19 may be arranged between the inner race of a bearing and a flange of the drivetrain, as will be known to the skilled person.

Although the present invention has been disclosed in the form of embodiments and variations thereon, it will be understood that numerous additional modifications and variations could be made thereto without departing from the scope of the invention. For example, fluid passages through the preload ring (for establishing the fluid cushion) can open into annular grooves formed in the inside surface of the housing, or vice versa.

For the sake of clarity, it is to be understood that the use of "a" or "an" throughout this application does not exclude a plurality, and "comprising" does not exclude other steps or elements.

The invention claimed is:

1. A main bearing unit of a wind turbine drivetrain, comprising:
   a plurality of bearings arranged about a low-speed shaft of the drivetrain;
   a housing arranged to enclose the bearings;
   a preload ring arranged between an inner surface of the housing and the outer race of a bearing, which preload ring is configured to facilitate its axial displacement during a bearing preload reinstatement procedure;
   a fastener for fixing the position of the preload ring to the housing following a bearing preload reinstatement procedure; and
   a plurality of passages arranged to convey a compressed fluid to a region between the outer surface of the preload ring and a corresponding interior surface of the housing;
   wherein the main bearing unit is configured to facilitate relief of a radial force exerted by the interior surface of the housing on the outer surface of the preload ring to allow axial displacement of the preload ring during the bearing preload reinstatement procedure; and
   wherein the housing comprises an interior surface feature to support an axial displacement device.

2. The main bearing unit according to claim 1, wherein the preload ring fixing fastener comprises an annular arrangement of fasteners, each comprising a threaded portion to engage with an axial threaded bore formed in the preload ring or in the housing flange.

3. The main bearing unit according to claim 1, wherein the preload ring fixing fastener comprises a threaded ring comprising an external thread arranged to engage with a complementary threaded region of the housing.

4. A bearing preloading arrangement for use in reinstating preload in a bearing of a main bearing unit, wherein the main bearing unit is installed in an operational wind turbine drivetrain, and wherein the main bearing unit includes a plurality of bearings arranged about a low-speed shaft of the wind turbine drivetrain, a housing arranged to enclose the bearings, a preload ring arranged between an inner surface of the housing and the outer race of a bearing, which preload ring is configured to facilitate axial displacement during a bearing preload reinstatement procedure, and a fastener for fixing the position of the preload ring to the housing following the bearing preload reinstatement procedure, the arrangement comprising:
   a radial force relief device configured to relieve a radial force acting on the preload ring during the bearing preload reinstatement procedure;
   an axial displacement device configured to displace the preload ring in the axial direction, during radial force relief, from an initial position to a final position; and
   a tightening tool for tightening the fastener for fixing the position of the preload ring.

5. The bearing preloading arrangement according to claim 4, wherein the radial force relief device comprises a hydraulic arrangement configured to establish a fluid cushion between the housing interior surface and the preload ring outer surface.

6. The bearing preloading arrangement according to claim 4, wherein the radial force relief device comprises a compressed air supply and a number of hoses for conveying the compressed air to a region between the housing interior surface and the preload ring outer face.

7. The bearing preloading arrangement according to claim 4, wherein the axial displacement device comprises a hydraulic cylinder configured to exert an axial force against the side face of the preload ring) and/or wherein the axial displacement device comprises the preload ring fixing fastener and the tightening tool.

8. The bearing preloading arrangement according to claim 4, comprising a control arrangement configured to actuate the radial force relief device and the axial displacement device in a coordinated manner during a bearing preload reinstatement procedure.

9. A method of reinstating a preload force in a bearing of a main bearing unit, comprising:

providing the main bearing unit, wherein the main bearing unit includes a plurality of bearings arranged about a main shaft of the wind turbine drivetrain, a housing arranged to enclose the bearings, a preload ring arranged between an inner surface of the housing and the outer race of a bearing, which preload ring is configured to facilitate axial displacement during a bearing preload reinstatement procedure, and a fastener for fixing the position of the preload ring to the housing following the bearing preload reinstatement procedure;

arranging an axial displacement device and a radial force relief device in place relative to the housing and the preload ring;

actuating the radial force relief device to relieve a radial force acting on the preload ring; and actuating the axial displacement device to apply an axial force to the preload ring to displace the preload ring from an initial position to a final position; and subsequently actuating the fastener for fixing the position of the preload ring to secure the preload ring at the final position.

10. The method according to claim 9, comprising a rotation of the main shaft during actuation of the axial displacement device.

11. The method according to claim 9, comprising a preliminary step of determining an actual bearing preload force prior to reinstating the initial preload force.

* * * * *